United States Patent
Fuller

(10) Patent No.: US 9,469,006 B1
(45) Date of Patent: Oct. 18, 2016

(54) DRILLING MACHINE WITH AUTOMATIC LUBRICANT SHUT-OFF

(71) Applicant: Zephyr Manufacturing Co., Inc., Inglewood, CA (US)

(72) Inventor: Andrew D. Fuller, Gardena, CA (US)

(73) Assignee: Zephyr Manufacturing Co., Inc., Inglewood, CA (US)

( * ) Notice: Subject to any disclaimer, the term of this patent is extended or adjusted under 35 U.S.C. 154(b) by 117 days.

(21) Appl. No.: 14/188,562

(22) Filed: Feb. 24, 2014

Related U.S. Application Data

(60) Provisional application No. 61/769,013, filed on Feb. 25, 2013.

(51) Int. Cl.
| | | |
|---|---|---|
| B23Q 11/10 | (2006.01) | |
| B23B 39/10 | (2006.01) | |
| B23Q 5/32 | (2006.01) | |

(52) U.S. Cl.
CPC ........... *B23Q 11/1015* (2013.01); *B23B 39/10* (2013.01); *B23B 2270/027* (2013.01); *B23Q 5/32* (2013.01); *B23Q 5/326* (2013.01); *B23Q 11/1092* (2013.01); *Y10T 408/45* (2015.01); *Y10T 408/65* (2015.01); *Y10T 408/68* (2015.01); *Y10T 408/73* (2015.01)

(58) Field of Classification Search
CPC . Y10T 408/73; Y10T 408/68; Y10T 408/44; Y10T 408/45; Y10T 408/65; B23Q 11/1015; B23Q 11/1092; B23Q 5/22; B23Q 5/32; B23Q 5/326; B23Q 11/103
See application file for complete search history.

(56) References Cited

U.S. PATENT DOCUMENTS

| | | | | |
|---|---|---|---|---|
| 3,512,434 | A * | 5/1970 | Juhasz | B23Q 5/326 408/132 |
| 4,182,588 | A * | 1/1980 | Burkart | B23Q 1/70 408/126 |
| 4,612,998 | A * | 9/1986 | Vindez | B23Q 5/326 173/145 |
| 6,105,595 | A * | 8/2000 | Jensen | B23Q 1/0036 137/15.12 |
| 7,621,702 | B2 * | 11/2009 | Ende | F16N 7/38 137/461 |
| 2009/0183889 | A1 | 7/2009 | Veres | |
| 2010/0119316 | A1 * | 5/2010 | Galand | B23Q 5/326 408/1 R |

* cited by examiner

*Primary Examiner* — Daniel Howell
*Assistant Examiner* — Chwen-Wei Su
(74) *Attorney, Agent, or Firm* — Knobbe, Martens, Olson & Bear, LLP

(57) ABSTRACT

A positive feed drilling machine with a lubricant emitter. The drilling machine can have a pneumatic logic system that can automatically initiate retraction of a cutter spindle and cutting tool after a desired cutting stroke distance. Initiation of the retraction sequence can automatically shut off delivery of lubricant to the cutter tool.

13 Claims, 10 Drawing Sheets

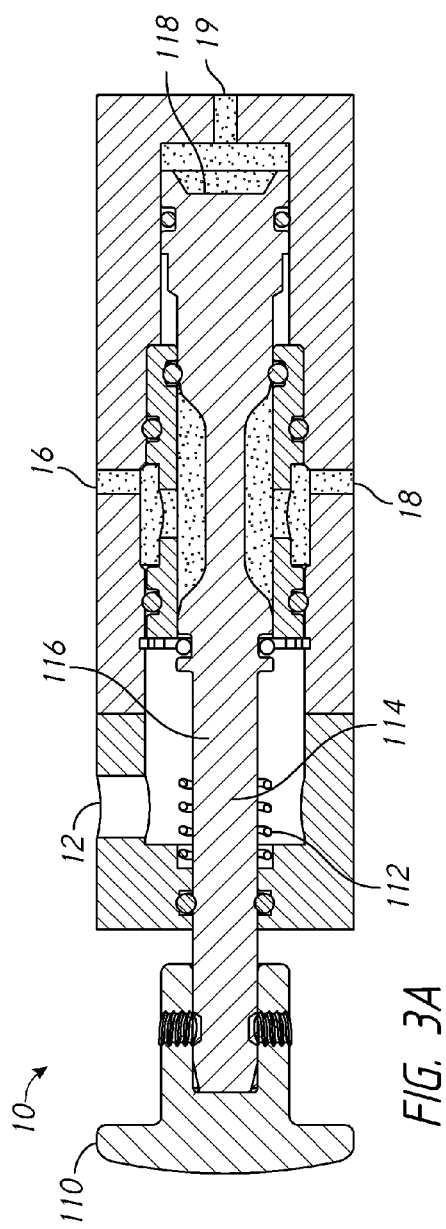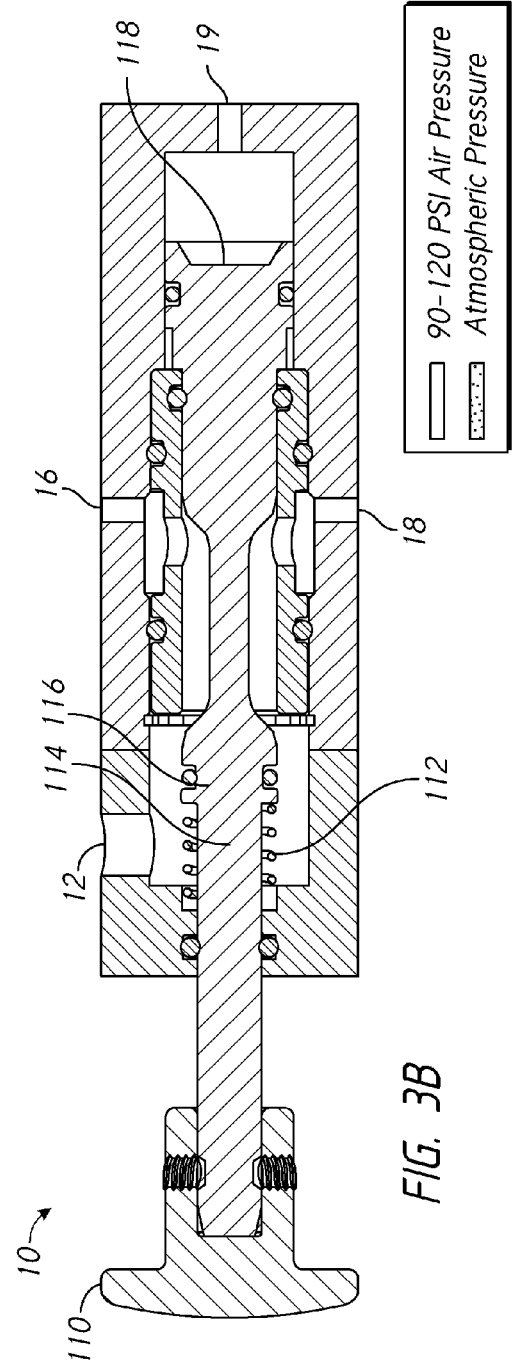
FIG. 3A
FIG. 3B

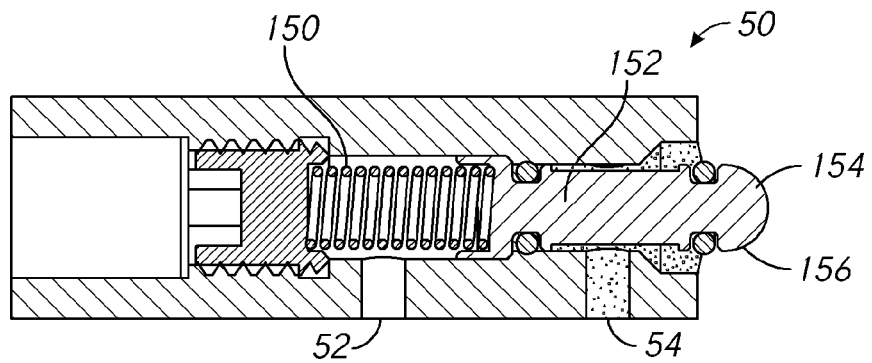
FIG. 6A
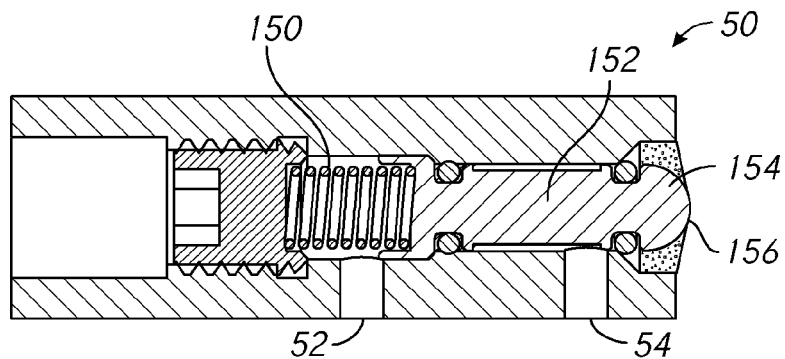
FIG. 6B
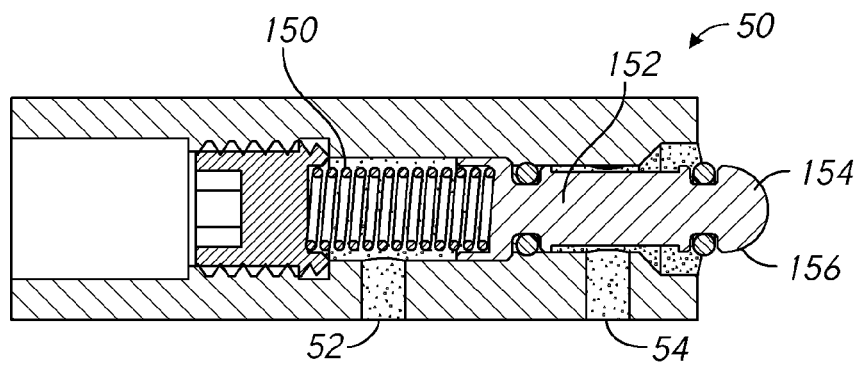
FIG. 6C
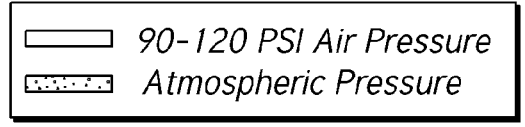

DRILLING MACHINE WITH AUTOMATIC LUBRICANT SHUT-OFF

INCORPORATION BY REFERENCE TO RELATED APPLICATIONS

Any and all priority claims identified in the Application Data Sheet, or any correction thereto, are hereby incorporated by reference under 37 CFR 1.57.

BACKGROUND OF THE INVENTION

1. Field of the Invention

The present invention generally relates to positive feed drills. More particularly, certain features, aspects and advantages of the present invention relate air motor positive feed drills.

2. Description of the Related Art

Positive feed drills are used to produce accurately placed and accurately dimensioned holes in work pieces. One application of this type of drill is in the aircraft industry where the holes are formed in materials that can be difficult to cut. To overcome issues relating to cutting through such materials, drilling/cutter lubricant can be delivered to the cutting surface to, among other things, provide lubrication, remove heat, and/or remove the cutting chips from the hole.

A common way to deliver drilling lubricant is by spraying a mist of air and drilling lubricant through the cutting tool via longitudinal holes that extend through the cutter from its shank to its tip. In this way, the atomized spray of cutting fluid is delivered directly to the cutting surface. After the point of the cutter has broken through the backside of the work piece, the cutter can continue to rotate as the drill is pulled back out of the hole. This can prevent the tool from becoming stuck in the hole, and also can improve the quality of the finished hole.

SUMMARY OF THE INVENTION

One problem that can occur with positive feed drilling machines is that, while the drill is still turning and the motor is still running, lubricant continues to spray through the holes in the end of the drill. Cleanup of this overspray can be costly, particularly in industries, such as the aircraft industry, where high numbers of these holes are drilled and there are structures behind the surfaces to be drilled that are difficult to access. Thus, minimizing overspray where possible can be desired.

One common way to minimize overspray is to use a rotary gland lubricant control device (see, e.g., U.S. Pat. No. 4,095,916). Such devices are generally installed between the spindle and the cutter of the drill. The devices receive lubricant (sometimes mixed with air) through a port and then feed the lubricant through a pressure-activated valve that is configured to open when a predetermined force is placed on the point of the cutter, such as when starting to drill a hole. When the cutter breaks through the backside of the material it is cutting and the pressure is removed, the valve shuts off and the flow of lubricant stops, thus limiting lubricant flow as the cutter is retracted out of the hole.

Rotary gland lubricators can present certain problems. Their size can require a larger diameter and longer nosepiece, which can, for example, increase the load on jigs supporting the tool during operation and/or increase operator fatigue and the time it takes to move the tool from one jig position to the next. The pressure-activated valves on rotary gland lubricators frequently have spring elements that are compressed when the valve is opened; when the leading edge of the cutting tool breaks through the backside of the work piece, the cutting tool can spring forward, possibly damaging the hole quality. Additionally, rotary gland lubricators can be prone to malfunction, and there is no easy way for an operator to know when the device is malfunctioning until one or more holes have been drilled and inspected. Therefore, there exists a need for improvement in positive feed drills and components to be used with or in the drills, including systems used to control delivery of drilling lubricant.

Certain advantageous embodiments disclosed herein reduce or eliminate these and other problems associated with positive feed drills that use a lubricant by providing a pneumatic logic control system that controls the application of lubricant. The pneumatic logic control system shuts off lubricant flow when a cutting tool on the drill moves forward a predetermined distance (e.g., passes through a desired stroke length). Some embodiments also can use a pneumatic logic control system to retract the cutter after it has passed through a desired stroke length. Further, certain of the embodiments described herein can be used without a rotary gland lubricator.

In various embodiments, a pneumatic positive feed drill can include a housing, an air motor at least partially within the housing, and an air valve with an air inlet, the air valve in fluid communication with the air motor. The drill can also include a cutter spindle with a first end adapted to couple to a cutter, the cutter spindle configured to move forward a predetermined distance from an initial position when the positive feed drill is activated and then return to the initial position, and an emitter configured to deliver lubricant to the first end of the cutter spindle when the cutter spindle moves forward from the initial position and to cease delivery of lubricant to the first end of the cutter spindle when the cutter spindle has moved the predetermined distance.

In various embodiments, a pneumatic positive feed drill can include a housing, an air motor at least partially within the housing, and a first valve with an air inlet adapted to connect to a source of pressurized air, the first valve in fluid communication with the air motor. The drill can also include a cutter spindle with a first end adapted to couple to a cutter, the cutter spindle configured to move forward when the positive feed drill is activated. The drill can further include an emitter with an inlet, the emitter configured to deliver lubricant to the cutter spindle when the inlet receives pressurized air, and a second valve configured to deliver pressurized air to the emitter when the positive feed drill is activated and to cease delivery of pressurized air to the emitter when the cutter spindle has moved forward a predetermined distance.

In some embodiments, a pneumatic positive feed drill includes a housing. The pneumatic positive feed drill can include an air motor at least partially within the housing. In some cases, the pneumatic positive feed drill includes a first valve in fluid communication with the air motor. The first valve can include an air inlet adapted to connect to a source of pressurized air. In some embodiments, pneumatic positive feed drill includes a cutter spindle with a first end adapted to couple to a cutter. The cutter spindle can be configured to move forward when the positive feed drill is activated. In some embodiments, the pneumatic positive feed drill includes an emitter comprising an inlet. The emitter can be configured to deliver lubricant to the cutter spindle when the inlet receives pressurized air. In some embodiments, the pneumatic positive feed drill includes a second valve configured to deliver pressurized air to the emitter when the positive feed drill is activated and to cease delivery of pressurized air to the emitter when the cutter spindle has moved forward a predetermined distance.

BRIEF DESCRIPTION OF THE DRAWINGS

These and other features, aspects and advantages of the present invention will be described with reference to the following drawings.

FIG. 3A illustrates a cross-sectional view of a main air valve of the positive feed drill shown in FIG. 1 with the valve in a first position.

FIG. 3B illustrates a cross-sectional view of the main air valve of FIG. 3A in a second position.

FIG. 6A illustrates a cross-sectional view of a pilot retract valve of the positive feed drill shown in FIG. 1 with the valve in a first position.

FIG. 6B illustrates a cross-sectional view of the pilot retract valve of FIG. 6A in a second position.

FIG. 6C illustrates a cross-sectional view of the pilot retract valve of FIG. 6A in a first position.

DETAILED DESCRIPTION OF THE PREFERRED EMBODIMENT

Figure 1:
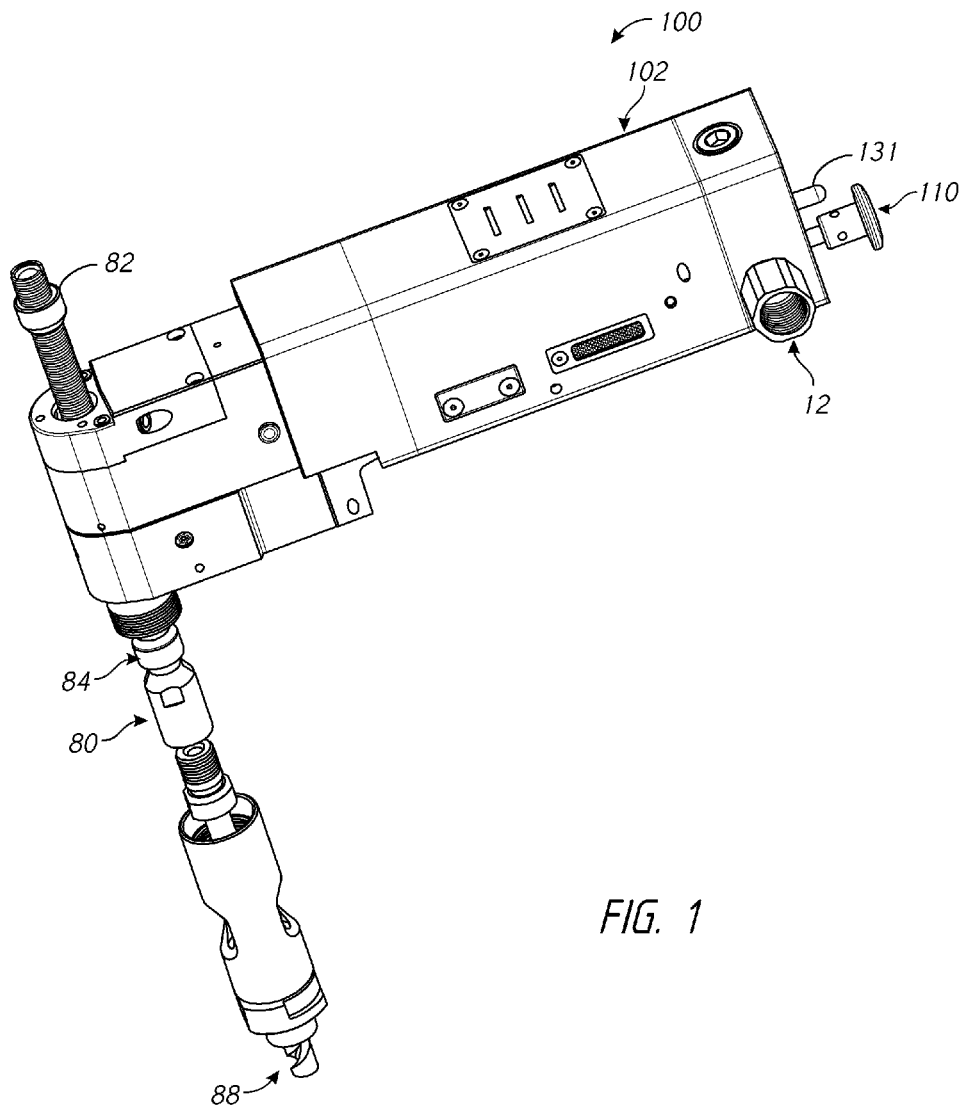
FIG. 1 illustrates a perspective view of a positive feed drill that is arranged and configured in accordance with certain features, aspects and advantages.

FIG. 1 illustrates a perspective view of a positive feed drill 100. The drill can include a housing 102 that generally encloses a plurality of valves and interconnecting passages. The passages can be defined within the housing or can comprise conduits, for example but without limitation.

As shown in FIG. 1, a main air valve spool knob 110 can extend outward from the housing 102. The knob 110 can be used to initiate a drill cycle or to manually stop a drill cycle that is already in progress. A retract valve spool knob 131 also can extend outward from the housing 102. The retract valve spool knob 131 can be used to manually initiate a retract sequence of a drill cycle that is already in progress. Both of these knobs 110, 131 can be used to initiate manual actions of the drill 100.

The drill 100 can also include an inlet 12, which can connect to a source of pressurized air (not shown). The drill 100 can further include a cutter spindle 80, which can attach to a cutter 88 or cutting tool. The cutter spindle 80 can have an upper spindle nut 82 and a lower spindle nut 84. The cutter spindle 80 in the illustrated configuration comprises an externally threaded surface and the upper and lower spindle nuts 82, 84 can be adjusted along the axial length of the externally threaded surface. As such, the upper and lower spindle nuts 82, 84 can be used to set a desired stroke length for the spindle 80, which sets the stroke length of the cutter 88. These components are all described in more detail below.

Figure 2:
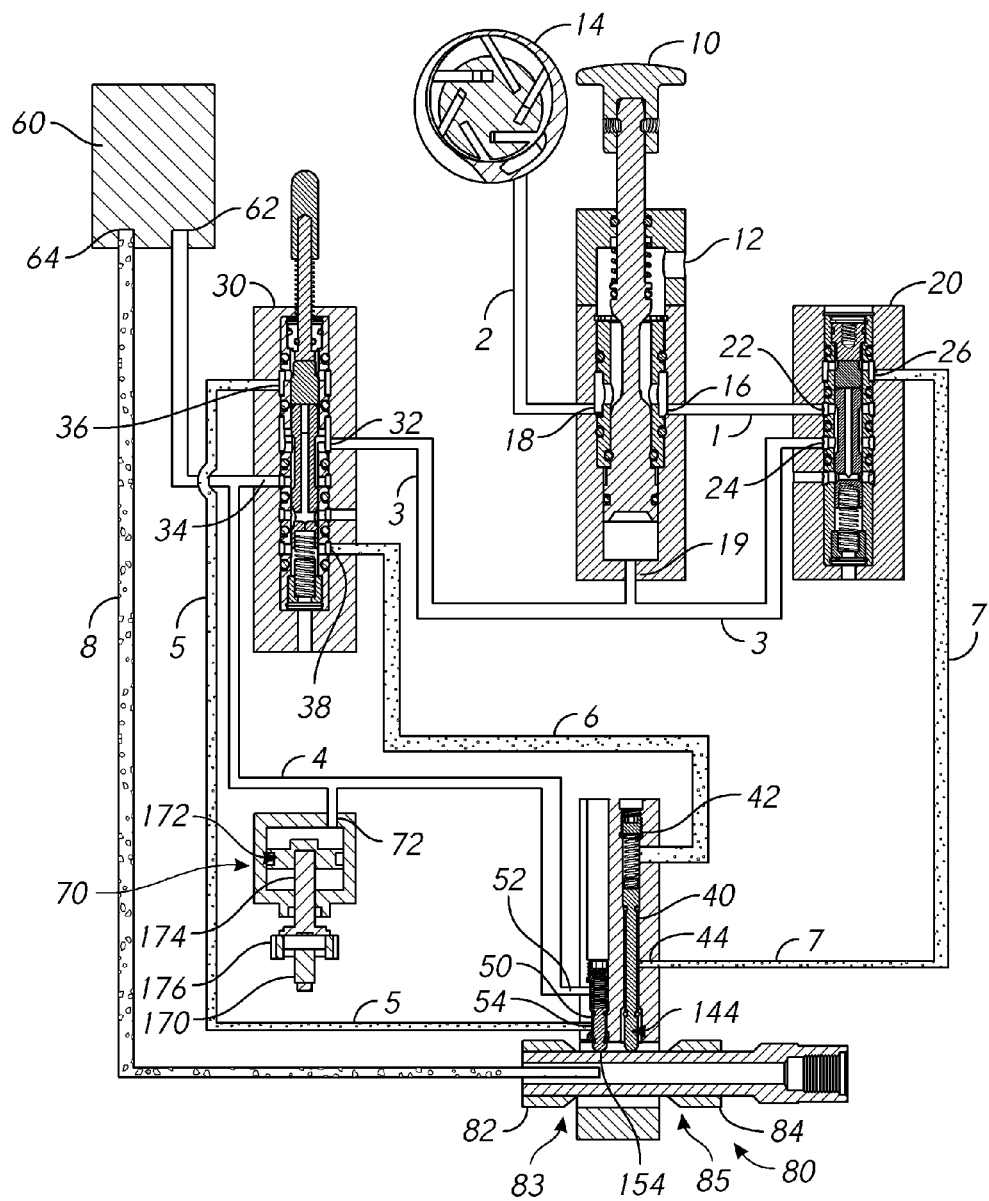
FIG. 2 illustrates a schematic diagram of connections between components of the positive feed drill shown in FIG. 1.

FIG. 2 illustrates a schematic diagram of the pneumatic connections between various components of the positive feed drill 100. At various times during the drilling process, various portions of the connections can operate at a first high pressure, a second low pressure, or some pressure between the two. In all of the figures, flow paths operating at the first pressure, which is the higher pressure, are illustrated in a darker shade than flow paths operating at the second pressure, which is the lower pressure.

The pressures of the connections as illustrated in FIG. 2 correspond to the positive feed drill 100 while in the process of drilling, with lubricant flowing from the emitter 60 to the cutter spindle 80. The pressure in each connection can vary according to different stages of the drilling process, as described in more detail below.

In some embodiments, as illustrated in FIG. 2, the first pressure, which is the higher pressure, can be between approximately 90 PSI and approximately 120 PSI. Similarly, the second pressure, which is the lower pressure, can be at approximately atmospheric/ambient pressure. The pressures listed in the figures are for illustration purposes only, however, and in some embodiments, the first pressure and/or second pressure can be higher or lower than the provided examples.

As the configuration illustrated in FIG. 2, a main air valve 10 can include the first inlet 12, which is adapted to receive a pressurized source of air. The main air valve 10 generally controls operation of the drill 100. The main air valve 10 has an outlet that can connect to a flow path 2 that connects to an air motor 14. The air motor 14 drives the spindle 80, for example but without limitation.

The main air valve 10 can also connect to a flow path 1 that connects to a shut off valve 20. The shut off valve 20 can be used to automatically terminate operation of the drill 100 at the completion of the full stroke of the spindle 80. The shut off valve 20 can have an outlet that connects to a flow path 3. The flow path 3 can connect to a retract valve 30 and a portion of the main air valve 10. The shut off valve 20 can also connect through a flow path 7 to a pilot shut off valve 40. The pilot shut off valve 40 can initiate shut-down of the drill 100 when the lower spindle nut 84 contacts a portion of the pilot shut off valve 40, for example.

The retract valve 30 can connect via a flow path 4 to an emitter 60, a clutch assembly 70, and a pilot retract valve 50. By connecting to the emitter 60 and the clutch assembly 70, operation of the clutch assembly 70 and the emitter 60 can be coupled. For example, the clutch assembly 70 in the illustrated configuration determines whether the spindle 80 is driven toward or away from the workpiece. As such, the retract valve 30 can be used to terminate the flow of lubricant from the emitter 60 when the spindle 80 completes the cutting portion of the stroke of the spindle 80.

The retract valve 30 can also connect via a flow path 5 to the pilot retract valve 50. Thus, the pilot retract valve 50 can initiate retraction of the cutter when the upper spindle nut 82 contacts a portion of the pilot retract valve 50, for example.

The retract valve 30 also connects via a flow path 6 to the pilot shut off valve 40. The retract valve 30 can prime the pilot shut off valve 40 to prepare the pilot shut off valve 40 for operation.

The emitter can connect via a flow path 8 to the cutting tool spindle 80, delivering a cutting lubricant and/or atomizing air through the spindle to the cutting tool.

Main Valve

FIG. 3A illustrates the main air valve 10 in a first position and FIG. 3B illustrates the main air valve 10 in a second position. The main air valve can have a shaft 114 and a spring 112 that biases the shaft 114 toward the first position. The main air valve 10 can also have a spool knob 110, which can be used to pull the shaft 114 outward. In the illustrated configuration, the knob 110 can be used to pull the shaft 114 outward against the biasing force of the spring 112. In some configurations, the shaft 114 can be configured to move inward rather than being pulled outward.

In the first position, the shaft 114 is configured to substantially block fluid communication between the first inlet 12 and a first outlet 16, which can connect to flow path 1, and a second outlet 18, which can connect to a flow path 2. In some configurations, seals can be provided that block or substantially block fluid flow when the shaft 114 is in the first position. With the shaft 114 in the second position, the first inlet 12 can be placed into fluid communication with the first outlet 16 and second outlet 18. In the illustrated configuration, recesses formed in the shaft 114 allow flow from the inlet 12 to the outlets 16, 18.

In some embodiments, the main air valve 10 also can have a second inlet 19. The second inlet communications with a chamber. The chamber volume can increase and decrease with axial movement of the shaft 114. In some configurations, the chamber is positioned such that movement of the shaft 114 caused by the spring 112 will tend to reduce the volume of the chamber. Similarly, as the chamber expands and the volume of the chamber increases, movement of the shaft 114 causes compression of the spring 112.

With reference still to FIG. 3A, the illustrated shaft 114 can have a first section 116 that is in fluid communication with the first inlet 12 and the first and second outlets 16, 18 when the main air valve is in the second position. The shaft 114 can also have a second section 118 that is in fluid communication with the second inlet 19. When the shaft 114 of the main air valve 10 is in the second position (see FIG. 3B), the volume of the chamber increases.

In some embodiments, the first section 116 can have a first net surface area (i.e., the surface area that can result in axial movement) that is exposed to air coming through the first inlet 12 and the second section 118 can have a second net surface area (i.e., the surface area that can result in axial movement) that is exposed to air coming through the second inlet 19. In some configurations, the first net surface area is less than the second net surface area. In such configurations, the axial force exerted on the shaft 114 by the second net surface area is greater than the axial force exerted on the shaft by the first net surface area. In some configurations, the axial force exerted on the shaft 114 by the first net surface area and the axial force exerted on the shaft 114 by the spring 112 are less than or substantially equal to the axial force exerted on the shaft 114 by the second net surface area when a predetermined pressure supply is in fluid communication with the first inlet 12 and the second inlet 19.

Shut-Off Valve

Figure 4A:
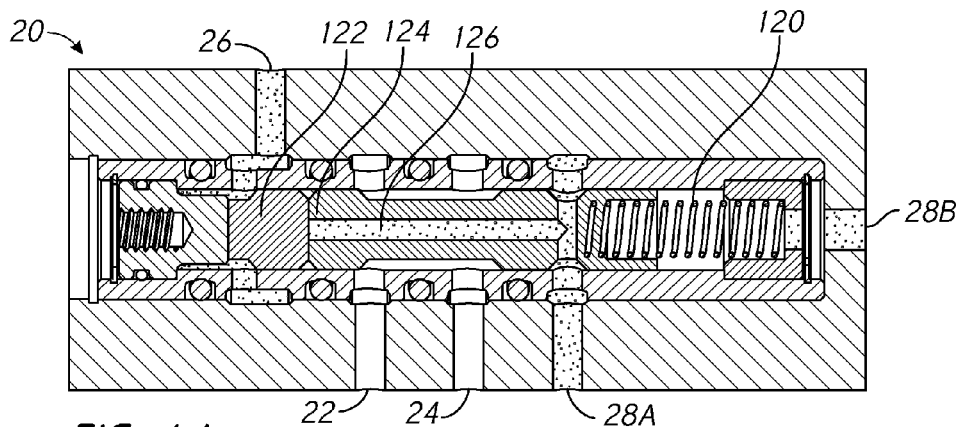
FIG. 4A illustrates a cross-sectional view of a shut off valve of the positive feed drill shown in FIG. 1 with the valve in a first position.
Figure 4B:
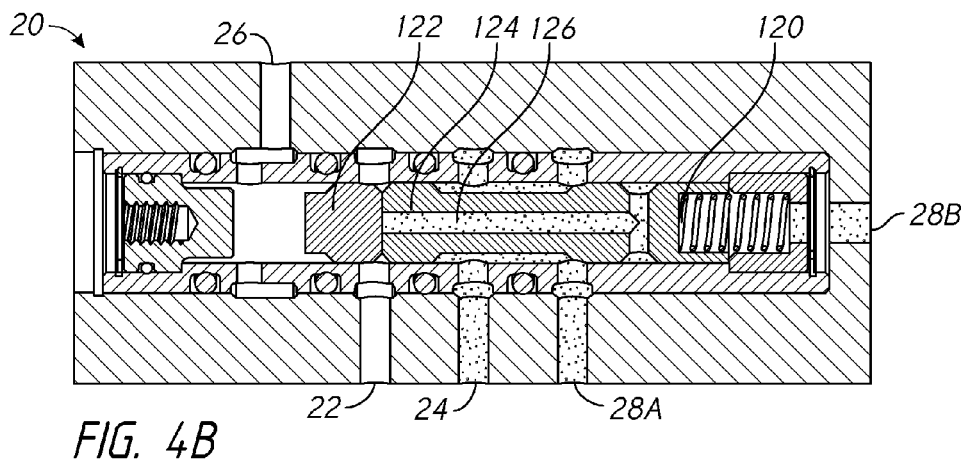
FIG. 4B illustrates a cross-sectional view of the shut off valve of FIG. 4A in a second position.
Figure 4C:
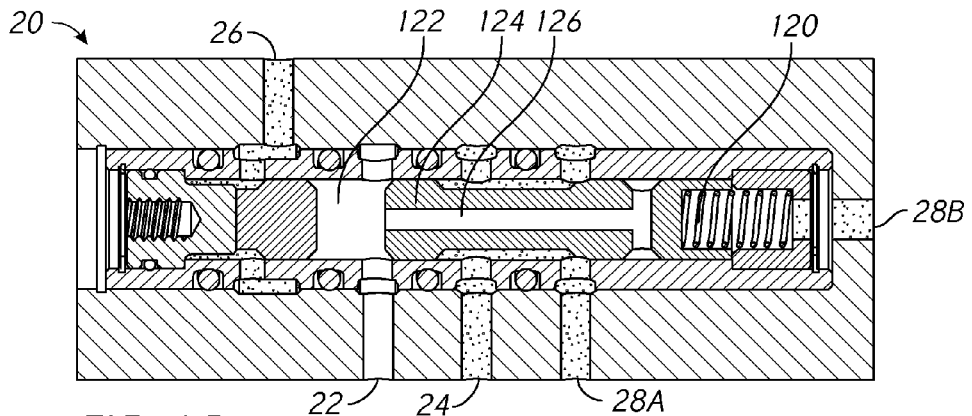
FIG. 4C illustrates a cross-sectional view of the shut off valve of FIG. 4A in a third position.

FIGS. 4A, 4B, and 4C illustrate the shut off valve 20 in first, second, and third positions, respectively. The shut off valve 20 can have a first inlet 22 that connects to the flow path 1, a second inlet 26 that connects to the flow path 7, a first outlet 24 that connects to the flow path 3, a first exhaust port 28A and a second exhaust port 28B. The exhaust ports described herein all can be in fluid communication with the atmosphere.

The shut off valve 20 can have a short spool 122 and a long spool 124 with a channel 126 extending through the long spool 124. The shut off valve 20 also can have a biasing member 120, such as a spring, that biases the short spool and long spool into the first position, as illustrated in FIG. 4A.

In the first position, the short spool 122 and long spool 124 are in contact with each other and the first inlet 22 (and thereby the flow path 1) is in fluid communication with the first outlet 24 (and thereby the flow path 3). In the second position, illustrated in FIG. 4B, the short spool 122 and the long spool 124 are in contact with each other, but both spools 122, 124 have moved toward the biasing member 120. In the second position, the short spool 122 and the long spool 124 collectively block the fluid connection between the first inlet 22 and the first outlet 24. In the second position, the first outlet 24 can be in fluid communication with the first exhaust port 28A. The short spool 122 and the long spool 124 can be configured such that fluid can drive the short spool 122 and the long spool 124 apart, such as, for example, when air pressure within the shut off valve 20 is exhausted from line 7 through port 26. When driven apart by the fluid, the third position is attained, as illustrated in FIG. 4C. As illustrated, the short spool 122 is positioned as it is when the shut off valve is in the first position, but the long spool 124 remains positioned as it is when the shut off valve is in the second position. Thus, a gap exists between the short and long spools. In the third position, the first outlet 24 can be in fluid communication with the first exhaust port 28A. When the shut off valve moves from the third position to the first position, as described below, the channel 126 can allow air between the short spool 122 and the long spool 124 to vent out of the first exhaust port 28A.

Retract Valve

Figure 5A:
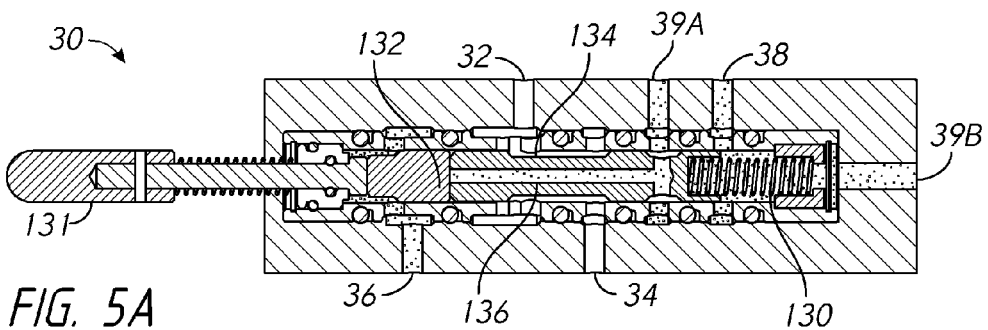
FIG. 5A illustrates a cross-sectional view of a retract valve of the positive feed drill shown in FIG. 1 with the valve in a first position.
Figure 5B:
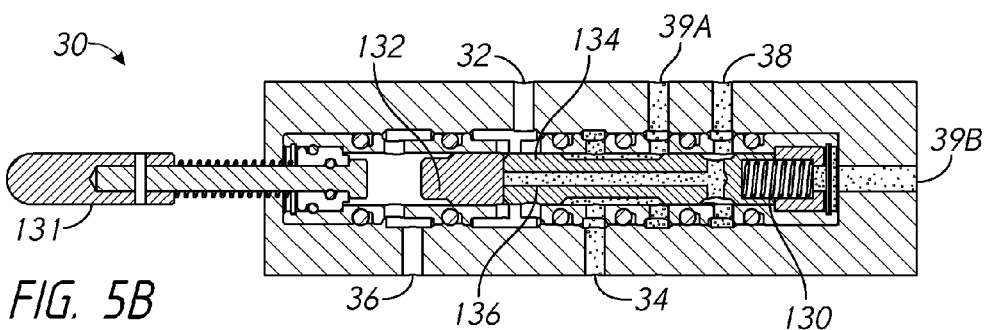
FIG. 5B illustrates a cross-sectional view of the retract valve of FIG. 5A in a second position.
Figure 5C:
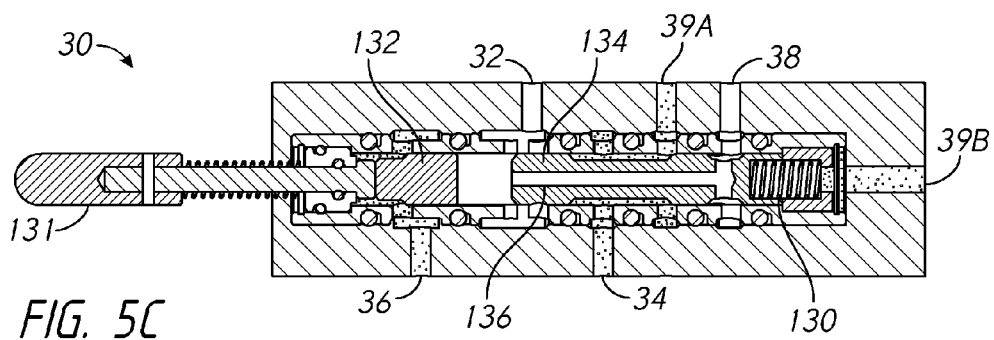
FIG. 5C illustrates a cross-sectional view of the retract valve of FIG. 5A in a third position.
Figure 5D:
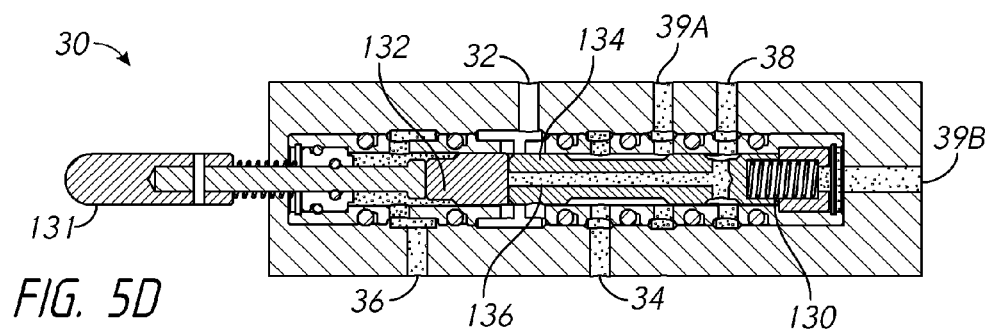
FIG. 5D illustrates a cross-sectional view of the retract valve of FIG. 5A in a fourth position.

FIGS. 5A, 5B, and 5C illustrate the retract valve 30 in first, second, third positions respectively. FIG. 5D illustrates the retract valve 30 in a manual second position.

The illustrated retract valve 30 can have a first inlet 32 that connects to the flow path 3, a second inlet 36 that connects to the flow path 5, a first outlet 34 that connects to the flow path 4, a second outlet 38 that connects to the flow path 6, a first exhaust port 39A and a second exhaust port 39B. The retract valve also can have a spool knob 131 that extends outside of the housing of the drill 100. The spool knob 131 can be used to manually transition the valve from the first position (FIG. 5A) to the second position (FIG. 5D).

Like the shut off valve 20, the retract valve 30 can have a short spool 132, a long spool 134 with a channel 136 extending through it, and a biasing member 130, such as a spring, that biases the short and long spools 132, 134 into the first position (see FIG. 5A). In the first position, the short spool 132 and long spool 134 are in contact with each other and the first inlet 32 and the flow path 3 are in fluid communication with the first outlet 34 and the flow path 4. Neither the first inlet 32 nor the first outlet 34 is in fluid communication with the second inlet 36 or the second outlet 38.

In the second position, which is illustrated in FIG. 5B, the short spool 132 and the long spool 134 are in contact with each other, but have moved toward the biasing member 130. The spools 132, 134 block the fluid connection between the first inlet 32 and the first outlet 34. In the second position, the first outlet 34 (and thus flow path 4) can be in fluid communication with the first exhaust port 39A.

In the third position, illustrated in FIG. 5C, the short spool 132 is positioned as it is when the retract valve 30 is in the first position, but the long spool 134 remains positioned as it is when the retract valve 30 is in the second position. Thus, a gap exists between the short and long spools 132, 134, and the first inlet 32 is placed in fluid communication with the channel 136 of the long spool and the second outlet 38 and the flow path 6. The first outlet 34 can remain in fluid communication with the first exhaust port 39A.

Pilot Retract Valve

FIGS. 6A and 6B illustrate the pilot retract valve 50 in a first and second position respectively. In the first position, a biasing member 150, such as a spring, biases a spool 152 such that at least a portion of a spool knob 154 at a distal end of the spool 152 extends out of the pilot retract valve. In the first position, the first inlet 52 is not in fluid communication with the first outlet 54. In the second position, illustrated in FIG. 6B, the spool knob 154 has been pushed at least partially back into the pilot retract valve 50 along with the spool 152, compressing the biasing member 150 and placing the first inlet 52 into fluid communication with the first outlet 54. In some embodiments, the knob 154 can have an angled or curved surface 156.

FIG. 6C illustrates the pilot retract valve 50 back in the first position, but when the first inlet 52, which is in fluid communication with flow path 4, is subject to a lower pressure than it is in FIG. 6A.

Pilot Shut-Off Valve

Figure 7A:
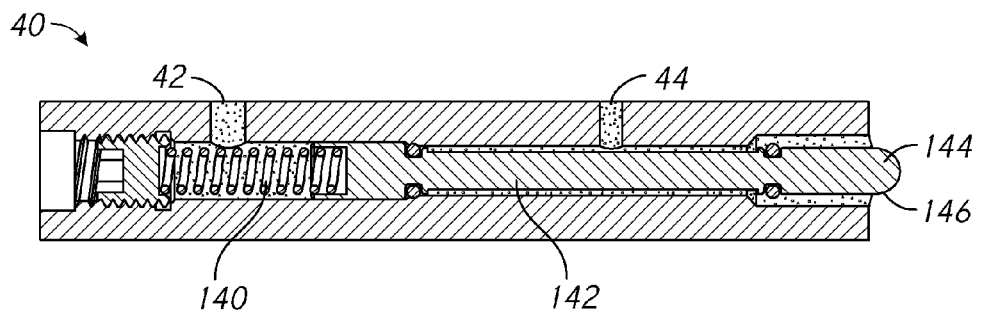
FIG. 7A illustrates a cross-sectional view of a pilot shut off valve of the positive feed drill shown in FIG. 1 with the valve in a first position.
Figure 7B:
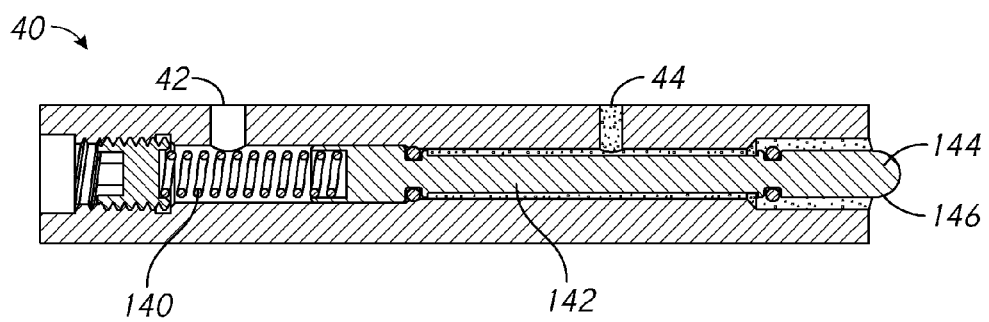
FIG. 7B illustrates a cross-sectional view of the pilot shut off valve of FIG. 7A in a first position.

FIGS. 7A and 7B illustrate the pilot shut off valve 40 in a first position in which a biasing member 140, such as a spring, biases a spool 142 such that at least a portion of a spool knob 144 at a distal end of the spool extends out of the pilot shut off valve. In the first position, the first inlet 42 is not in fluid communication with the first outlet 44. In FIG. 7A, the first inlet 42, which is in fluid communication with flow path 6, is subject to a lower pressure than it is in FIG. 7B.

Figure 7C:
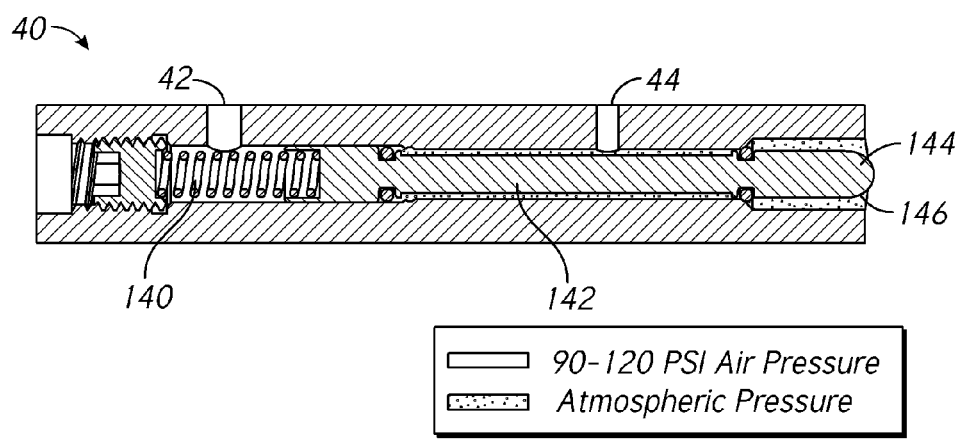
FIG. 7C illustrates a cross-sectional view of the pilot shut off valve of FIG. 7A in a second position.

FIG. 7C illustrates the pilot shut off valve 40 in a second position, in which the spool knob 144 has been pressed at least partially into the pilot shut off valve along with the spool 142, compressing the biasing member 140 and placing the first inlet 42 into fluid communication with the first outlet 44. In some embodiments, the spool knob 144 can have an angled or curved surface 146. In some embodiments, described in more detail below, the pilot shut off valve can be in the second position with both the first inlet 42 and the first outlet 44 at ambient pressure.

Clutch Assembly and Clutch Operation

Figure 8A:
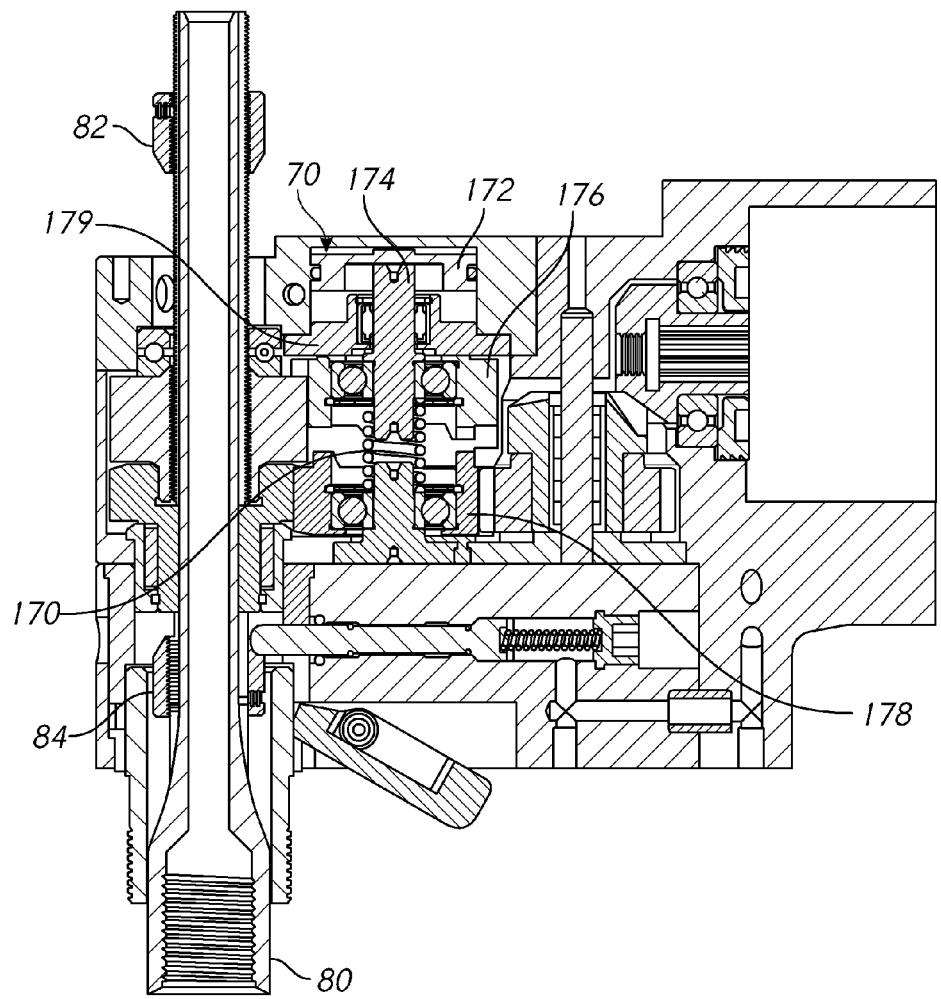
FIG. 8A illustrates a cross-sectional view of a portion of the positive feed drill shown in FIG. 1 that includes a clutch assembly in a first position.
Figure 8B:
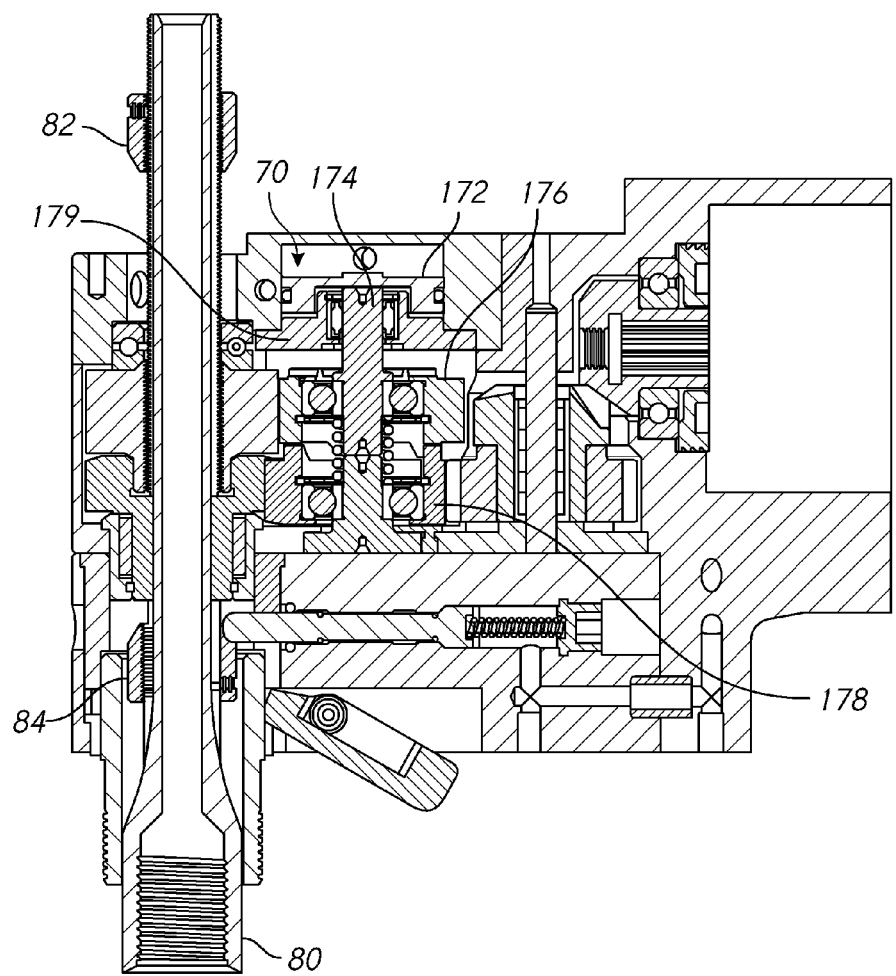
FIG. 8B illustrates a cross-sectional view of a portion of the positive feed drill shown in FIG. 1 that includes the clutch assembly in a second position.

FIGS. 8A and 8B illustrate a cross-sectional view of a portion of a drill that includes a clutch assembly 70, which can be arranged and configured in accordance with U.S. patent application Ser. No. 12/703,627, filed on Feb. 10, 2010, which patent application is hereby incorporated by reference in its entirety. The clutch assembly can include an air piston 172, a floating shaft 174, an upper clutch gear 176, a lower clutch gear 178, and a biasing member 170, such as a spring, that biases the upper clutch gear away from the lower clutch gear. FIG. 8A illustrates the clutch assembly in a first position in which the upper clutch gear and the lower clutch gear are not engaged with each other. FIG. 8B illustrates the clutch assembly in a second position in which the upper clutch gear 176 and the lower clutch gear 178 are engaged with each other.

The clutch assembly can be configured such that when the pressure in flow path 4 increases and passes through the inlet 72 (visible in FIG. 2), the increased pressure can drive the air piston 172, floating shaft 174, and upper clutch gear 176 toward the lower clutch gear 178. If the pressure is sufficient, the upper clutch gear 176 can engage the lower clutch gear 178. FIG. 8B illustrates the clutch assembly 70 in the second position.

Figure 9:
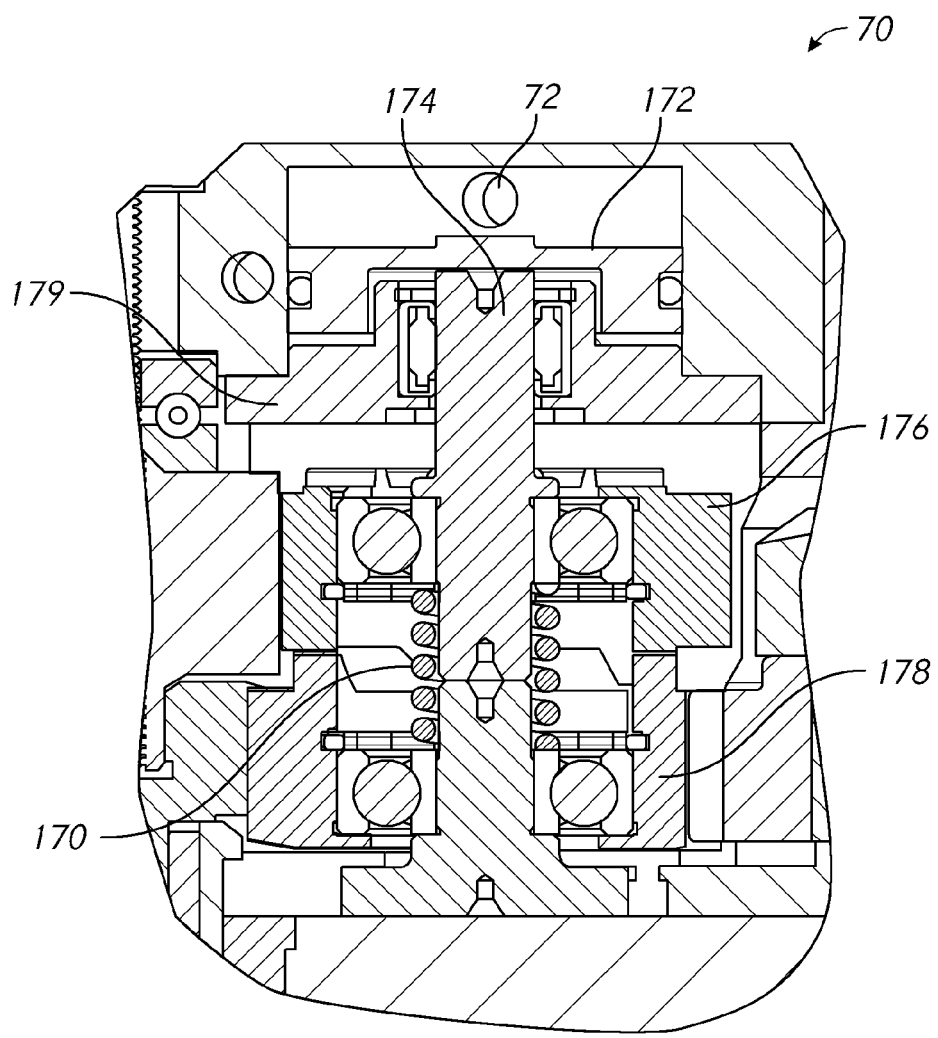
FIG. 9 illustrates a cross sectional view of the clutch assembly of FIGS. 8A and 8B.

When the upper clutch gear 176 and the lower clutch gear 178 are forcibly engaged by the air pressure acting upon the piston 172 as described above, the cutter spindle 80 is driven via a gearing arrangement to rotate and move (or feed) in an axial direction toward the workpiece. When the air pressure is removed from the piston 172, the biasing member 170 can disengage the upper clutch gear 176 from the lower clutch gear 178 and engage the upper clutch gear 176 with the fixed clutch ring 179. When this occurs, the cutter spindle is driven via a gearing arrangement to rotate and move (or retract) in an axial direction away from the workpiece. The gearing arrangement referred to in this section that controls the rotation and feed/retract of the cutter spindle can be achieved by, but is not limited to, that which is described in detail within U.S. patent application Ser. No. 12/703,627, the entire contents of which are hereby incorporated by reference herein. FIG. 9 is a more detailed cross-sectional view of the clutch assembly 70 in the second position.

In some embodiments, the cutter spindle 80 can have the upper spindle nut 82 and the lower spindle nut 84. The upper spindle nut 82 can have a curved or angled surface 83 that can be configured to contact the curved or angled surface 156 of the spool knob 154 of the pilot retract valve 50 as the cutter spindle 80 moves toward the work piece. As described in more detail below, this contact can cause the cutter spindle to retract and the flow of lubricant to stop. Thus, the distance between the upper spindle nut 82 and the spool knob 154 can be set according to a desired stroke length of the drill.

If the upper clutch gear 176 disengages from the lower clutch gear 178, the cutter spindle 80 can move such that the cutter retracts from the work piece. The lower spindle nut 84 can have a curved or angled surface 85 that can be configured to contact the curved or angled surface 146 of the spool knob 144 of the pilot shut off valve 40 as the cutter spindle moves away from the work piece.

Emitter

With returning reference to FIG. 2, the positive feed drill 100 can also have an emitter 60, which can be configured to release a flow of cutting lubricant/coolant mixed with air through an outlet 64 when an inlet 62 of the emitter is subject to a predetermined pressure.

Operation

The following description relates to the operation of the illustrated drill 100, and in particular the pneumatic control logic that shuts off the flow of lubricant and that retracts the cutter spindle once a desired stroke length has been achieved. The description will generally be made with reference to FIG. 2, but at various points will also refer to other specific figures. Additionally, the description does not necessarily follow the order in which certain actions occur.

In particular, many of the pressure changes described herein may occur simultaneously or in different orders than described.

A user may begin operating the illustrated positive feed drill 100, which can be connected at its inlet 12 to a source of air at a first pressure that is preferably higher than atmospheric pressure, by pulling on the spool knob 110 of the main air valve 10. Pulling on the spool knob 110 moves the main air valve 10 into the second position, which is illustrated in FIG. 3B.

With the main air valve 10 in the second position, the air at the first pressure can connect to and activate the air motor 14. Air at the first pressure also can flow to the shut off valve 20, which can be in the first position (see FIG. 4A). With the shut off valve 20 in the first position, air at the first pressure can flow along flow path 3 toward the retract valve 30.

When the flow path 3 contains air at the first pressure, the second inlet 19 of the main air valve 10 can receive air at the first pressure. Because the first section 116 of the shaft 114 (FIGS. 3A and 3B) has a net surface area exposed to air coming through the first inlet 12 that is less than the net surface area of the second section 118 that is exposed to air coming through the second inlet 19, as described above, the shaft 114 can experience a net pressure differential that can bias it toward the second position. In some embodiments, the main air valve 10 can be configured such that the force from this pressure differential is approximately equal to the force on the shaft 114 from the biasing member 112. Thus, the main air valve 10 can maintain an equilibrium in the second position.

The retract valve 30 can begin in the first position (see FIG. 5A) such that, as pressurized air enters the first inlet 32, the pressurized air can proceed through the first outlet 34 and into the flow path 4.

Pressurized air in the flow path 4 can lead to three components. First, the pressurized air can lead to the clutch assembly 70. Within the clutch assembly 70, the pressurized air can drive the air piston 172, the floating shaft 174, and the upper clutch gear 176 toward the lower clutch gear 178. The movement of the air piston 172, the floating shaft 174 and the upper clutch gear 176 can cause the upper clutch gear 176 to engage with the lower clutch gear 178. With the upper and lower clutch gears 176, 178 engaged, the cutter spindle 80 rotates and is driven toward the work piece, as discussed above (see FIGS. 8B and 9). Second, the pressurized air can lead to the emitter 60, which can release a flow of lubricant through the outlet 64 and through the cutter spindle 80 to the cutting tool (not illustrated). Third, the pressurized air can lead to the pilot retract valve 50, energizing it as illustrated in FIG. 6A.

In some embodiments, the cutter spindle 80 can be in an initial position in which the lower spindle nut 84 pushes the spool knob 144 of the pilot shut off valve 40 against the biasing member 140, such that the shut off pilot valve 40 is in the second position (see FIG. 7C) when the drill 100 is activated. In the initial position before the cutter spindle 80 begins a stroke, the first inlet 42 and first outlet 44 are both preferably operating at atmospheric pressure. The first inlet 42 can be connected to the atmosphere through the retract valve 30 while the first outlet 44 can be connected to the atmosphere through the shut off valve 20.

As the cutter spindle 80 begins to move toward the work piece, the lower spindle nut 84 can move away from the spool knob 144, allowing the biasing member 140 to push the spool knob 144 outward such that the pilot shut off valve is positioned as in FIG. 7A. With the pilot shut off valve 40 in the position shown in FIG. 7A, the first inlet 42 and the first outlet 44 are disconnected from each other.

As the cutter spindle 80 moves further toward the work piece, the curved or angled surface 83 of the upper spindle nut 82 can contact the curved or angled surface 156 of the spool knob 154 of the pilot retract valve 50. As the cutter spindle 80 continues to move, it can drive the spool 152 of the pilot retract valve 50 against the biasing member 150, moving the pilot retract valve 50 into the second position (FIG. 6B).

In the second position, the pilot retract valve 50 allows pressurized air to flow through the first outlet 54 and into the flow path 5. This initiates retraction of the cutter spindle and the process of turning off the flow of lubricant. Thus, the distance that the cutter spindle moves before the upper spindle nut 82 contacts the spool knob 154 is approximately equal to a stroke length of the drill.

Pressurized air passing into flow path 5 can pass into the retract valve 30 through the second inlet 36. Within the retract valve 30, the pressurized air drives the short spool 132 and long spool 134 against the biasing member 130 and into the second position (see FIG. 5B). With the short spool 132 and the long spool 134 in this position, the flow of pressurized air from the first inlet 32 to the first outlet 34 (and flow path 4) is obstructed, as described above. In addition, with the short spool 132 and the long spool 134 in this position, the first outlet 34 (and flow path 4) is connected to the first exhaust port 39A.

With flow path 4 connected to the first exhaust port 39A, the air pressure in flow path 4 can return to the second pressure, which for illustration purposes will be described as generally equal to the ambient pressure. Having flow path 4 at ambient pressure can yield a number of results.

First, with flow path 4 at the ambient pressure, the biasing member 170 of the clutch assembly can drive the upper clutch gear 176, the floating shaft 174, and the air piston 172 back way from the lower clutch gear 178, disengaging the upper clutch gear from the lower clutch gear 178 and engaging the upper clutch gear 176 with the fixed clutch ring 179 (FIG. 8A). This gearing shift can cause the cutter spindle 80 to retract, (e.g., move away from the work piece), which withdraws the cutter from the work piece.

As the cutter spindle 80 moves away from the work piece, the curved or angled surface 83 of the upper spindle nut 82 can disengage from the curved or angled surface 156 of the spool knob 154 of the pilot retract valve 50. The biasing member 150 of the pilot retract valve 50 can then return the pilot retract valve 50 to the first position, as illustrated in FIG. 6C. In the first position, the pressurized air in flow path 5 is able to bleed out through the first outlet 54 and around the spool knob 154. Flow path 4 at ambient pressure also drops the pressure at the inlet 62 to the emitter 60 back to ambient, which shuts off the flow of lubricant.

With flow path 5 at ambient pressure, the first pressure at the first inlet 32 of the retract valve 30 drives the short spool 132 away from the long spool 134, though it maintains pressure on the long spool 134 to press it against the biasing member 130. Thus, the retract valve 30 is now in the third position (FIG. 5C), and pressurized air flows out of the second outlet 38 into flow path 6.

The pressurized air in flow path 6 can flow through the inlet 42 of the pilot shut off valve 40, as illustrated in FIG. 7B. As the cutter spindle 80 continues to move away from the work piece, the curved or angled surface 85 of the lower spindle nut 84 can contact the curved or angled surface 146 of the spool knob 144 of the pilot shut off valve 40, driving the pilot shut off valve 40 into the second position (FIG. 7C) and allowing the pressurized air to flow through outlet 44 and into flow path 7.

Pressurized air in flow path 7 can enter the shut off valve 20 through the second inlet 26, driving the short spool 122 and long spool 124 against the biasing member 120, thereby placing the shut off valve into the second position (FIG. 4B). In the second position, the flow of pressurized air from flow path 1 to flow path 3 is cut off. Additionally, because flow path 3 is now in fluid communication with the first exhaust port 28A of the shut off valve 20, the pressure in flow path 3 can return to ambient.

With flow path 3 at ambient pressure, the short spool 122 of the shut off valve 20 is driven away from the long spool 124 by the pressure in flow path 1, but the pressure in flow path 1 acts on the long spool 124 and/or the biasing member 120 to put the shut off valve in the third position (FIG. 4C). Additionally, with flow path 3 at ambient pressure, the pressure acting against the second section 118 of the shaft 114 of the main air valve 10 can return to ambient as well, and the biasing member 112 can drive the shaft back into the first position (FIG. 3A).

With the main air valve 10 in the first position, pressurized air is cut off from flow path 1 and flow path 2. Flow path 1 can exhaust out through the air motor 14, which will then shut off. The remaining flow paths can exhaust through available exhaust ports, and the various pneumatic valves can return back to their positions at the beginning of the cycle.

In some embodiments, if an operator of the drill desires to withdraw the cutter from a work piece at a point in the work cycle prior to completion of a full stroke of the cutter spindle 80, the operator can manually press in the spool knob 131 of the retract valve 30, which places the retract valve into the second position as illustrated in FIG. 5D. This initiates the sequence described above to retract the cutter spindle 80 and stop the flow of lubricant. The motor will continue to run and the cutter spindle and cutter will continue to rotate as the cutter spindle retracts from the workpiece until the lower spindle nut 84 contacts the spool knob of the pilot shut-off valve 40 and activates the shut-off of the tool, as described above.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A pneumatic positive feed drill comprising:
   a housing;
   an air motor at least partially within the housing;
   a valve in fluid communication with the air motor, the valve comprising an air inlet;
   a cutter spindle with a first end adapted to couple to a cutter, the cutter spindle configured to move forward a predetermined distance from an initial position when the positive feed drill is activated and then return to the initial position;
   an emitter configured to deliver lubricant to the first end of the cutter spindle when the cutter spindle moves forward from the initial position and to cease delivery of lubricant to the first end of the cutter spindle when the cutter spindle has moved the predetermined distance; and
   a retract valve configured to shut off fluid communication between the emitter and a source of pressurized air when the cutter spindle has moved the predetermined distance.

2. The pneumatic positive feed drill of claim 1 further comprising a pilot retract valve in fluid communication with the retract valve, wherein the cutter spindle actuates the pilot retract valve when the cutter spindle has moved the predetermined distance.

3. The pneumatic positive feed drill of claim 2, wherein actuation of the pilot retract valve moves the retract valve to a shut off position wherein the retract valve shuts off fluid communication between the emitter and a source of pressurized air.

4. A pneumatic positive feed drill comprising:
   a spindle that is adapted to be driven through a stroke toward a work piece, a spindle nut being positioned along the spindle;
   a lubricant emitter adapted to supply lubricant to a cutter attached to the spindle only when positive pressure is supplied to the emitter;
   a first valve having a first valve component that contacts the spindle nut at the end of the stroke toward the work piece; and
   the first valve component causing the removal of positive pressure that is supplied to the emitter when the first valve component contacts the spindle nut;
   wherein the first valve component is adapted to open a flow path through the first valve; and
   wherein the first valve is fluidly connected to a second valve and an inlet to the first valve is connected to an inlet to the second valve only when the flow path through the first valve is opened.

5. The pneumatic positive feed drill of claim 4, wherein the second valve is fluidly connected to the lubricant emitter.

6. The pneumatic positive feed drill of claim 5, wherein the second valve interrupts a supply of positive pressure to the lubricant emitter when the flow path through the first valve is opened.

7. The pneumatic positive feed drill of claim 5, wherein the inlet to the first valve and the lubricant emitter are fluidly connected.

8. The pneumatic positive feed drill of claim 7, wherein opening the flow path through the first valve connects the lubricant emitter to atmospheric pressure.

9. A method of controlling a supply of lubricant to a cutting tool of a pneumatic positive feed drill, the method comprising moving the cutting tool through a cutting stroke; supplying lubricant during the cutting stroke; indicating the end of the cutting stroke, and terminating the supply of lubricant by removing an air pressure from an emitter at the end of the cutting stroke,
- wherein indicating the end of the cutting stroke includes contacting a spindle nut connected to the cutting tool to a valve actuator, and
- wherein the valve actuator moves in a direction perpendicular to the cutting stroke when the spindle nut contacts the valve actuator.

10. A pneumatic positive feed drill comprising:
- a housing;
- an air motor at least partially within the housing;
- a first valve in fluid communication with the air motor, the first valve comprising an air inlet adapted to connect to a source of pressurized air;
- a cutter spindle with a first end adapted to couple to a cutter, the cutter spindle configured to move forward when the positive feed drill is activated;
- an emitter comprising an inlet, the emitter configured to deliver lubricant to the cutter spindle when the inlet receives pressurized air;
- a second valve configured to deliver pressurized air to the emitter when the positive feed drill is activated and to cease delivery of pressurized air to the emitter when the cutter spindle has moved forward a predetermined distance.

11. A pneumatic positive feed drill comprising:
- a housing;
- an air motor at least partially within the housing;
- a valve in fluid communication with the air motor, the valve comprising an air inlet;
- a cutter spindle with a first end adapted to couple to a cutter, the cutter spindle configured to move forward a predetermined distance from an initial position when the positive feed drill is activated and then return to the initial position;
- an emitter configured to deliver lubricant to the first end of the cutter spindle when the cutter spindle moves forward from the initial position and to cease delivery of lubricant to the first end of the cutter spindle when the cutter spindle has moved the predetermined distance; and
- a retract valve spool knob adapted to stop forward movement of the cutter spindle when manually actuated.

12. A pneumatic positive feed drill comprising:
- a spindle that is adapted to be driven through a stroke toward a work piece, a spindle nut being positioned along the spindle;
- a lubricant emitter adapted to supply lubricant to a cutter attached to the spindle only when positive pressure is supplied to the emitter;
- a first valve having a first valve component that contacts the spindle nut at the end of the stroke toward the work piece;
- the first valve component causing the removal of positive pressure that is supplied to the emitter when the first valve component contacts the spindle nut; and
- a second nut positioned along the spindle, wherein contact between the second nut and a shut-off valve when the spindle is returned to a starting position shuts off the pneumatic positive feed drill.

13. A method of controlling a supply of lubricant to a cutting tool of a pneumatic positive feed drill, the method comprising:
- moving the cutting tool through a cutting stroke;
- supplying lubricant during the cutting stroke;
- indicating the end of the cutting stroke, and
- terminating the supply of lubricant by removing an air pressure from an emitter at the end of the cutting stroke,
- wherein indicating the end of the cutting stroke includes contacting a spindle nut connected to the cutting tool to a valve actuator,
- wherein a second lower spindle nut is connected to the spindle, and
- wherein contact between the second lower spindle nut and a shut-off pilot valve when the cutting tool is returned to a starting position shuts off the cutting tool.

* * * * *